(12) United States Patent
Doehring et al.

(10) Patent No.: US 7,754,630 B2
(45) Date of Patent: *Jul. 13, 2010

(54) LARGE TRANSMISSIVE OPTICAL COMPONENT

(75) Inventors: Thorsten Doehring, Mainz (DE); Ina Mitra, Stadecken-Elsheim (DE)

(73) Assignee: Schott AG, Mainz (DE)

( * ) Notice: Subject to any disclaimer, the term of this patent is extended or adjusted under 35 U.S.C. 154(b) by 1448 days.

This patent is subject to a terminal disclaimer.

(21) Appl. No.: 10/878,557

(22) Filed: Jun. 28, 2004

(65) Prior Publication Data

US 2005/0014626 A1  Jan. 20, 2005

(30) Foreign Application Priority Data

Jul. 16, 2003 (DE) .................. 103 33 399

(51) Int. Cl.
*C03C 3/097* (2006.01)
*C03C 3/085* (2006.01)
*C03C 3/062* (2006.01)

(52) U.S. Cl. .................. 501/63; 501/69; 501/73

(58) Field of Classification Search ............. 501/63, 501/69, 73, 4, 7; 359/839
See application file for complete search history.

(56) References Cited

U.S. PATENT DOCUMENTS

| 3,642,504 | A | * | 2/1972 | Petzold et al. | 501/63 |
|---|---|---|---|---|---|
| 3,661,546 | A | * | 5/1972 | Busdiecker et al. | 65/33.5 |
| 3,907,577 | A | * | 9/1975 | Kiefer et al. | 501/4 |
| 4,009,042 | A | * | 2/1977 | Rittler | 501/4 |
| 4,851,372 | A | * | 7/1989 | Lindig et al. | 501/4 |
| 5,508,235 | A | * | 4/1996 | Marker | 501/7 |
| 5,591,682 | A | * | 1/1997 | Goto | 501/4 |
| 6,197,710 | B1 | * | 3/2001 | Ohara et al. | 501/4 |
| 6,300,264 | B1 | * | 10/2001 | Ohara | 501/64 |
| 6,635,591 | B2 | * | 10/2003 | Nagata et al. | 501/3 |
| 6,846,760 | B2 | * | 1/2005 | Siebers et al. | 501/32 |
| 2001/0056021 | A1 | * | 12/2001 | Nagata et al. | 501/9 |
| 2002/0023463 | A1 | * | 2/2002 | Siebers et al. | 65/99.5 |
| 2004/0107731 | A1 | | 6/2004 | Doehring et al. | |

FOREIGN PATENT DOCUMENTS

| DE | 1 596 860 | 9/1970 |
|---|---|---|
| DE | 1 902 432 | 9/1970 |
| DE | 1 596 865 | 8/1971 |
| DE | 1 696 062 | 11/1972 |
| EP | 1 391 433 A2 | 2/2004 |
| FR | 1 474 728 | 7/1965 |
| JP | 63242945 | 7/1988 |
| JP | 03-037135 | 2/1991 |
| JP | 2001-52334 | 2/2001 |

OTHER PUBLICATIONS

Pavlushkin, Stroyizdat, 1983, pp. 287-294.

* cited by examiner

*Primary Examiner*—Karl E Group
*Assistant Examiner*—Elizabeth A Bolden
(74) *Attorney, Agent, or Firm*—Harness, Dickey & Pierce, P.L.C.

(57) ABSTRACT

An optical glass for the manufacture of large transmission optics, such as lenses having a thickness of 100 millimeters or more, comprises 35 to 70 wt.-% $SiO_2$, 17 to 35 wt.-% $Al_2O_3$, 3 to 17 wt.-% $P_2O_5$, 0 to 6 wt.-% $Li_2O$, 0.5 to 4 wt.-% MgO, 0.5 to 3 wt.-% ZnO, a maximum of 1 wt.-% CaO, a maximum of 0.5 wt.-% BaO, 0.5 to 6 wt.-% $TiO_2$, 0.5 to 3 wt.-% $ZrO_2$, 0 to 1 wt.-% $Na_2O$, 0 to 1 wt.-% $K_2O$, a maximum of 1 wt.-% of refining agents ($As_2O_3$, $SP_2O_3$) and a maximum of 500 ppm of other contaminants. The glass composition may be equal to the composition of the glass ceramic Zerodur® and allows to manufacture large transmission optics in a cost-effective way, has a maximum of transmittance which is in the range of a He—Ne lasers and has a CTE of about $3 \cdot 10^{-6}$/K.

24 Claims, 1 Drawing Sheet

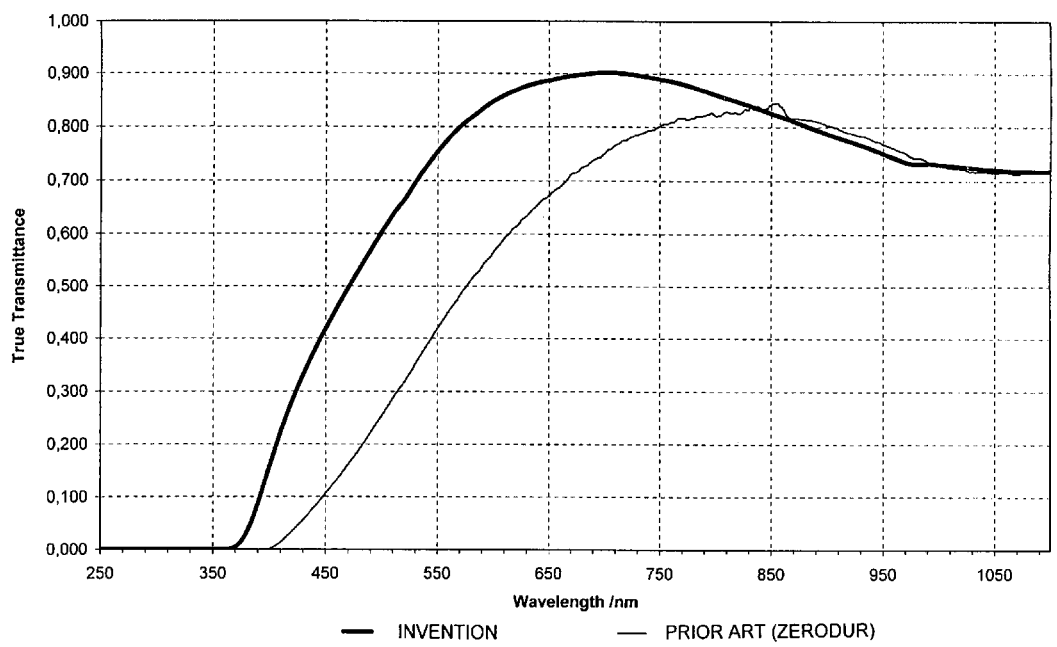

LARGE TRANSMISSIVE OPTICAL COMPONENT

BACKGROUND OF THE INVENTION

The invention relates to an optical glass which, in particular, is suited for the preparation of transmissive optical components of a considerable size or of a considerable volume, respectively.

Prior art optical glasses offer a good homogeneity, good transmission characteristics in the desired spectral range and favorable Abbe numbers, however, the manufacture of optically transmissive components, such as lenses, prisms and windows of large sizes, e.g. having a diameter of 0.5 m or 1 m or a thickness of 50 mm, 100 mm or more, respectively, is very demanding under practical considerations.

For testing the polishing quality of highly precise astronomic mirrors, in particular of convex secondary mirrors, to this end usually in the interferometric testing devices often reference lenses, so-called matrices, are utilized. Common for this purpose are for example bi-convex lenses having at least one surface strongly shaped aspherically.

There are demanding requirements for the material of theses lenses with respect to the number of striae and to the homogeneity of refractive index. Preferably, a material having a low coefficient of expansion is utilized. In addition, herein a transmittance as high as possible is desired at the laser wavelength of 633 nm that is commonly utilized in testing.

Up to now, for such applications optical glasses, such as BK7 or FK5, are utilized. However, the manufacture of such large optical parts, such as of lenses having a diameter of 1 to 1.5 m or a thickness of 100 to 150 mm, respectively, is not possible therewith, at least not in an economically feasible way.

From German patent specification DE 1 596 860 and from German examined patent application DE 1 902 432, a glass ceramic is known that is marketed by the applicant under the trademark Zerodur®. However, such a glass ceramic is not suitable glass for the production of large optically transmissive optical components, since, due to the many dispersive centers generated by the crystalline inclusions, the transmission is impaired. Also the base glass has a slightly yellowish coloring which is negative for the transmission.

SUMMARY OF THE INVENTION

Thus, it is a first object of the invention to disclose an optical glass allowing an easy manufacture of optically transmissive components, such as lenses, prisms, mirrors and the like having a large size, such as having a lateral extension of at least 0.5 or 1 m or having a thickness of at least 50 mm or 100 mm, respectively.

It is a second object of the invention to disclose an optical glass allowing the manufacture of large optically homogenous components of high quality in an economical way.

It is a third object of the invention to disclose an optical glass having a coefficient of thermal expansion as low as possible.

It is a forth object of the invention to disclose an optical glass having a sufficient true transmittance in the optically visible range, in particular in the range between 600 and 750 nanometers.

It is a fifth object of the invention to disclose a large optically transmissive component comprising such an optical glass that can be produced in an economically feasible way.

It is a sixth object of the invention to disclose a cost effective process for the manufacture of optically transmissive components of large size.

According to the invention, these and other objects are solved by an optical glass having the following composition (in wt.-%):

| | |
|---|---|
| $SiO_2$: | 35-75 |
| $Al_2O_3$: | 17-35 |
| $B_2O_3$: | 0-5 |
| $P_2O_5$: | 1-17 |
| $SnO_2 + ZrO_2 + TiO_2$: | 0.1-8 |
| $Na_2O + K_2O + Cs_2O + Li_2O$: | 0.1-8 |
| $CaO + MgO + SrO + BaO + ZnO$: | 0.1-8 |
| refining agents such as $Sb_2O_3$, $As_2O_3$, $SnO_2$, $CeO_2$, sulfate or halogenide compunds: | $\leq 2$ |
| coloring oxides such as $V_2O_5$, $Cr_2O_3$, MnO, $Fe_2O_3$, CoO, NiO and other impurities: | $\leq 1$. |

Thereby, the object of the invention is fully achieved.

The optical glass according to the invention allows the preparation of transmissive optical components at large dimensions, e.g. the manufacture of lenses having a diameter of 1.5 m or more. The optical glass according to the invention allows the manufacture of such large optical parts using a casting process in an economical way. Preferably, the optical glass is molten in a batch melting device, is controllably cooled and thereafter mechanically processed, in particular cut, ground, lapped and polished to produce optically transmissive components of large size, such as lenses, prisms and windows.

In particular, such an optical glass is suitable for preparing testing optics for large aspheric mirrors or mirror segments, respectively, e.g. for the manufacture of bi-convex lenses having at least one surface strongly shaped aspherically and having a diameter of 1.5 m or more.

Under an "optical glass" in this application a clear glass particularly suitable for optically transmissive parts having a transmittance as high as possible in the visible spectral range being largely free of inhomogeneities and stresses is perceived. The optical glass according to the invention thus is not obvious from the known prior art glass ceramics, since the person skilled in the art does not contemplate such a composition for an optical glass. The base glass for the manufacture of such glass ceramics does not have the necessary purity and normally has a slightly yellowish coloring which is a potential obstacle against an application as an optical glass.

According to a preferred development of the invention the optical glass has the following composition:

| | |
|---|---|
| $SiO_2$ | 35-70 |
| $Al_2O_3$ | 17-35 |
| $P_2O_5$ | 3-17 |
| $Li_2O$ | 2-6 |
| MgO | 0.5-4 |
| ZnO | 0.5-3 |
| CaO | $\leq 1$ |
| BaO | $\leq 0.5$ |
| $TiO_2$ | 0.1-6 |
| $ZrO_2$ | 0.1-3 |
| $Na_2O$ | 0-1 |
| $K_2O$ | 0-1 |
| $As_2O_3$ | $\leq 1$ |

-continued

|  |  |
|---|---|
| $Sb_2O_3$ | ≤1 |
| other impurities | ≤0.5. |

According to a further advantageous development of the invention, the optical glass has the following composition:

|  |  |
|---|---|
| $SiO_2$ | 50-60 |
| $Al_2O_3$ | 20-30 |
| $P_2O_5$ | 3-12 |
| $Li_2O$ | 3-4 |
| MgO | 0.5-2.5 |
| ZnO | 0.5-3 |
| CaO | <1 |
| BaO | <0.5 |
| $TiO_2$ | 1.5-3.5 |
| $ZrO_2$ | 1-2.5 |
| $Na_2O$ | 0-1 |
| $K_2O$ | 0-1 |
| $As_2O_3 + Sb_2O_3$ | ≤1 |
| other impurities | ≤0.2. |

In particular with such composition ranges particularly advantageous transmittance values can be reached.

To further improve the transmittance, it is preferred to keep coloring impurities, noble metals and halogenides, in particular $Fe_2O_3$, PbO, Pt, Rh, $Cl^-$ and $F^-$ to a maximum of 500 ppm each.

In addition, it is preferred that the optical glass according to the invention has a maximum content of $Fe_2O_3$ of 120 ppm, preferably of 80 ppm.

This is advantageous to guarantee a sufficient true transmittance also at large thicknesses, in particular in the desired optical range and in particular at the sample wavelength range of 633 nm.

Preferably, the optical glass according to the invention in the range between 0° C. and 50° C. has a coefficient of thermal expansion of $4.1 \cdot 10^{-6}$/K at the most, preferably of $3.5 \cdot 10^{-6}$/K at the most, particularly preferred of about $3 \cdot 10^{-6}$/K.

Due to this particularly low coefficient of expansion, the optical glass according to the invention is particularly suited for making optically transmissive components of large sizes. Namely, due to the small differences in the coefficients of thermal expansion the generation of stresses and fractures is considerably reduced when compared to prior art optical glasses, the coefficient of thermal expansion is usually $\geq 4.4 \cdot 10^{-6}$/K. Thereby in particular also image distortions caused by temperature deviations are reduced.

The optical glass according to the invention preferably has a refractive index $n_d$ which is in the range of $1.42 \leq n_d \leq 1.63$, preferably in the range of $1.47 \leq n_d \leq 1.58$.

In addition, the optical glass according to the invention preferably has an Abbe number $v_d$ which is in the range of $53 \leq v_d \leq 63$, preferably in the range of $57.1 \leq v_d \leq 59.1$. Thus, the optical glass according to the invention in the Abbe diagram is in the region of crown glasses, however, has a different chemical composition.

The true transmittance of the optical glass according to the invention for a test body of 100 mm length in the wavelength range between 500 and 750 nm is at least 0.55, in the wavelength range between 550 and 750 nm at least 0.7, and in the range between 600 and 750 nm at at least 0.8.

The optical glass according to the invention preferably has the maximum of its true transmittance in the wavelength range between about 600 and 750 nm.

With respect to the process of making optically transmissive components of large dimensions the object of the invention is solved by melting a glass of the composition mentioned above preferably in a batch melting device, by controllably cooling and subsequently mechanically processing, in particular cutting, grinding, lapping and polishing.

It will be understood that the afore-mentioned features are not applicable only in the given combination, but also in other combinations or independently without going beyond the scope of the invention.

Further features and advantages of the invention can be taken from the subsequent description of a preferred embodiment with reference to the drawing.

BRIEF DESCRIPTION OF THE DRAWING

The single FIGURE shows a comparison between the true transmittance of a glass according to the invention with the true transmittance of the glass ceramic Zerodur® of identical composition, in dependence of the wavelength.

DETAILED DESCRIPTION OF THE PREFERRED EMBODIMENTS

The invention will now be more fully described with reference to a particular example that is of merely exemplary nature and is not intended to limit the scope of the invention in any kind whatsoever.

EXAMPLE

A glass of the following composition (in wt.-%) was molten:

|  |  |
|---|---|
| $SiO_2$ | 57.2 |
| $Al_2O_3$ | 25.3 |
| $P_2O_5$ | 6.5 |
| $Li_2O$ | 3.4 |
| MgO | 1.0 |
| ZnO | 1.4 |
| $Na_2O$ | 0.2 |
| $K_2O$ | 0.4 |
| $As_2O_3$ | 0.5 |
| $TiO_2$ | 2.3 |
| $ZrO_2$ | 1.8 |

By using particularly pure starting materials and crucible materials, impurities, in particular coloring impurities, noble metals and halogenides were kept to a maximum of 500 ppm each. The $FeO_2O_3$ content was about 80 ppm.

Melting was performed at about 1500 to 1600° C., wherein for refining the temperature was raised to about 1600° C. During homogenization the temperature was lowered to about 1400° C. For forming and preparing a lens of a diameter of about 1.5 m the melt was poured into a well-isolated form which had been pre-heated to about 1200° C. Subsequently cooling to a temperature above the glass transition temperature $T_g$ was performed as fast as possible, e.g. up to about 700° C. within several hours. In this way crystallization during the cooling phase was minimized. In a second step thereafter a controlled cooling to room temperature was performed at sufficiently small cooling rate to avoid fractures and stresses, to which end depending on the diameter of the glass block a cooling rate of 1.0 K/min at the most was used, in the present case of about 0.1 K/min.

Such a glass block can be mechanically processed to prepare optically transmissive components there from, e.g. a bi-convex lens having at least one strongly aspherically shaped surface and a diameter of 1.5 m. On this glass block manufactured in this way the coefficient of thermal expansion (CTE) in the range between 0° C. and 50° C. was measured to be $3.02 \cdot 10^{-6}$/K, while it was detected to be $2.97 \cdot 10^{-6}$/K in the range between −30° C. and 70° C.

The density of the optical glass was 2452.7 kg/m³.

The glass transition temperature $T_g$ was found to be about 675° C. The refractive index $n_d$ was detected to be 1.526 with an Abbe number $v_d$ of 58.12.

The measured true transmittance for a test body of 100 mm length according to the invention is given in dependence from the wavelength in FIG. 1 (the true transmittance is a pure material characteristic by contrast to the transmittance, since the reflection losses of the test body at the light entrance and the light exit that are included in the transmittance are eliminated in the true transmittance).

For comparison in FIG. 1 also the measured true transmittance of a second test body of 100 mm length consisting of the glass ceramic Zerodur® according to the prior art is given in dependence from the wavelength.

It can be seen that the glass according to the invention even at a thickness of 100 mm in the range between 600 und 750 nm has a true transmittance of more than 0.8, thus having in particular an approximate maximum of the true transmittance for the wavelength range of a commonly used He—Ne laser of 633 nm. By contrast, the glass ceramic Zerodur® has a considerably smaller true transmittance in the spectral range of interest while having the same composition apart from that. In particular, if still larger dimensions are contemplated, such as thicknesses of up to 500 mm or more, the superiority of the glass according to the invention is obvious, since the true transmittance decreases exponentially with increasing thickness.

Apart from the preferred application as test optics for large astronomical mirror telescopes also further applications are conceivable, such as lenses in astronomical camera systems and correction optics, as well as prisms in such telescopes of respectively large dimensions.

What is claimed is:

1. A transmissive optical component comprising an optical glass comprising (in wt.-%):

| | |
|---|---|
| $SiO_2$ | 35-75 |
| $Al_2O_3$ | 17-35 |
| $B_2O_3$ | 0-5 |
| $P_2O_5$ | 1-17 |
| $SnO_2 + ZrO_2 + TiO_2$ | 0.1-8 |
| $Na_2O + K_2O + Cs_2O + Li_2O$ | 0.1-8 |
| $CaO + MgO + SrO + BaO + ZnO$ | 0.1-8 |
| Refining agents: | ≦1 |
| coloring oxides and other impurities: | ≦1; | said optically transmissive component having a coefficient of thermal expansion in the range between 0° C. and 50° C. being $4.1 \cdot 10^{-6}$/K at the most.

2. The component of claim 1, wherein said optical glass comprises (in wt.-%):

| | |
|---|---|
| $SiO_2$ | 35-70 |
| $Al_2O_3$ | 17-35 |
| $P_2O_5$ | 3-17 |
| $Li_2O$ | 2-6 |
| MgO | 0.5-4 |
| ZnO | 0.5-3 |
| CaO | ≦1 |
| BaO | ≦0.5 |
| $TiO_2$ | 0.1-6 |
| $ZrO_2$ | 0.1-3 |
| $Na_2O$ | 0-1 |
| $K_2O$ | 0-1 |
| $As_2O_3$ | ≦1 |
| $Sb_2O_3$ | ≦1 |
| other impurities | ≦0.5. |

3. The component of claim 1, wherein said optical glass comprises (in wt.-%):

| | |
|---|---|
| $SiO_2$ | 50-60 |
| $Al_2O_3$ | 20-30 |
| $P_2O_5$ | 3-12 |
| $Li_2O$ | 3-4 |
| MgO | 0.5-2.5 |
| ZnO | 0.5-3 |
| CaO | <1 |
| BaO | <0.5 |
| $TiO_2$ | 1.5-3.5 |
| $ZrO_2$ | 1-2.5 |
| $Na_2O$ | 0-1 |
| $K_2O$ | 0-1 |
| $As_2O_3 + Sb_2O_3$ | ≦1 |
| other impurities | ≦0.2; | wherein the component has a true transmittance in the wavelength range between 500 and 750 nanometers which is at least 0.55 for a test body of a length of 100 millimeters.

4. The component of claim 1, wherein said optical glass comprises a maximum of 500 ppm of any element selected from the group consisting of coloring agents, noble metals and halogenides.

5. The component of claim 1, wherein said optical glass comprises a maximum of 500 ppm of any element selected from the group consisting of $Fe_2O_3$, PbO, Pt, Rh, Cl⁻, and F⁻.

6. The component of claim 1, wherein said optical glass comprises a maximum of 120 ppm of $Fe_2O_3$.

7. The component of claim 1, wherein said optical glass comprises a maximum of 80 ppm of $Fe_2O_3$.

8. The component of claim 1, having a coefficient of thermal expansion in the range between 0° C. and 50° C. being $3.5 \cdot 10^{-6}$/K at the most.

9. The component of claim 1, having a coefficient of thermal expansion in the range between 0° C. and 50° C. being about $3 \cdot 10^{-6}$/K.

10. The component of claim 1, having a refractive index $n_d$ in the range of $1.42 \leq n_d \leq 1.63$.

11. The component of claim 1, having a refractive index $n_d$ in the range of $1.47 \leq n_d \leq 1.58$.

12. The component of claim 1, having an Abbe coefficient $v_d$ in the range of $53 \leq v_d \leq 63$.

13. The component of claim 1, having an Abbe coefficient $v_d$ in the range of $57.1 \leq v_d \leq 59.1$.

14. The component of claim 1, having a true transmittance in the wavelength range between 500 and 750 nanometers which is at least 0.55 for a test body of a length of 100 millimeters.

15. The component of claim 1, having a true transmittance in the wavelength range between 550 and 750 nanometers which is at least 0.7 for a test body of a length of 100 millimeters.

16. The component of claim 1, having a true transmittance in the wavelength range between 600 und 750 nanometers which is at least 0.8 for a test body of a length of 100 millimeters.

17. The component of claim 1, having a true transmittance comprising a maximum that is in the wavelength range between 600 and 750 nanometers.

18. The component of claim 1, having a thickness of at least 50 millimeters.

19. The component of claim 1, having a thickness of at least 100 millimeters.

20. The component of claim 1, having a lateral extension of at least 0.5 meters.

21. The component of claim 1, having a lateral extension of at least 1 meter.

22. The component of claim 1, which is part of a test optic for an aspheric mirror telescope.

23. The component of claim 1, being configured as a component selected from the group consisting of a lens and a prism.

24. The component of claim 1, being configured as a component selected from the group consisting of a lens and a prism and further having a maximum thickness of at least 50 millimeters and a maximum lateral extension of at least 0.5 meters.

* * * * *